US012799802B2

(12) United States Patent
Mccorriston

(10) Patent No.: US 12,799,802 B2
(45) Date of Patent: Nov. 17, 2026

(54) WINDOW FRAMING SYSTEM FOR SHIPPING CONTAINERS

(71) Applicant: Safe Box Steel Structures Inc., Saskatoon (CA)

(72) Inventor: Channing Mccorriston, Saskatoon (CA)

(73) Assignee: Safe Box Steel Structures Inc., Saskatoon (CA)

( * ) Notice: Subject to any disclaimer, the term of this patent is extended or adjusted under 35 U.S.C. 154(b) by 160 days.

(21) Appl. No.: 18/760,906

(22) Filed: Jul. 1, 2024

(65) Prior Publication Data

US 2026/0002403 A1 Jan. 1, 2026

(51) Int. Cl.
*E06B 1/14* (2006.01)

(52) U.S. Cl.
CPC .................................... *E06B 1/14* (2013.01)

(58) Field of Classification Search
CPC ................. E06B 1/14; E06B 1/02; E06B 1/04
See application file for complete search history.

(56) References Cited

U.S. PATENT DOCUMENTS

2012/0102858 A1* 5/2012 Carlson ..................... E06B 1/56 52/745.15

FOREIGN PATENT DOCUMENTS

KR 200400151 Y1 * 11/2005 ............... E06B 1/04

* cited by examiner

*Primary Examiner* — Patrick J Maestri
(74) *Attorney, Agent, or Firm* — Spencer Fane, LLP

(57) ABSTRACT

A window framing system for installation in a shipping container wall aperture, including a corrugation cap to cover a lower edge of the aperture and the adjacent corrugations, and the corrugation cap configured for supporting a lower portion of a window within the window framing system. The corrugation cap is a C-shaped channel with inner and/or outer downwardly-directed portions configured for positioning adjacent inner and/or outer surfaces of the wall, respectively. The system may also include a rain drip member mounted on an upper surface of the frame to receive water on an upper surface and redirect the water outwardly away from the wall. Tabs can be used to assemble the side frame members to the header and footer frame members, allowing assembly by a single person, and the tabs may further allow securing of the frame components using holes outside the container envelope for fasteners (thus reducing the risk of leakage inside the wall cavity).

16 Claims, 14 Drawing Sheets

HEADER PROFILE

FOOTER PROFILE

SIDE PROFILE

SIDE PROFILE

WINDOW FRAMING SYSTEM FOR SHIPPING CONTAINERS

FIELD OF THE INVENTION

The present invention relates to window framing systems, and specifically to window framing systems for shipping containers.

BACKGROUND OF THE INVENTION

Shipping containers are used for various purposes, including transportation, storage, and conversion into livable or usable areas. However, adding traditional building features like windows to these steel structures is challenging. The current methods for installing windows in shipping containers involve substantial material usage, difficult installation procedures, and problems with water leakage and structural compatibility.

Traditionally, such window frames are created by welding together four pieces of angle iron, square tubing, or rectangular tubing. The outside dimensions of the frame correspond to the rough opening size in the container. The frame is then welded to the container exterior, for receipt of a vinyl window. However, welding can potentially cause warping in the window frame, leading to improper functioning of the vinyl window. Additionally, this process often requires grinding to remove any sharp edges and the bare steel requires surface preparation and recoating which often leads to rust. Additionally, shipping containers are often manufactured with corten steel and the steel welded window frames are typically mild steel; this leads the installer to unknowingly use an improper weld procedure.

SUMMARY OF THE INVENTION

According to a first broad aspect of the present invention, there is provided a window framing system for installation in an aperture in a shipping container wall, the shipping container wall comprising corrugations, the system comprising:

- a corrugation cap sized and configured to cover at least a portion of a lower edge of the aperture and the corrugations adjacent thereto; and
- the corrugation cap configured for positioning thereon of a lower portion of a window within the window framing system.

In some exemplary embodiments of the first broad aspect, the corrugation cap is a C-shaped channel comprising inner and/or outer downwardly-directed portions configured for positioning adjacent inner and/or outer surfaces of the wall, respectively.

Exemplary window framing systems may further comprise a header frame member, a footer frame member, and right and left side frame members, such that the frame members are configured for connection to form a quadrilateral frame for receipt of the window therein. Each of the frame members preferably comprises an inwardly-directed flange to form a flange mounting perimeter when the frame members are secured together, to which flange mounting perimeter the window is configured for mounting.

The footer frame member is preferably disposed between the corrugation cap and the lower portion of the window.

In some exemplary embodiments with a header frame member, the system comprises a rain drip member mounted on an upper surface of the header frame member, the rain drip member configured to receive water on an upper surface thereof and direct the water outwardly away from the wall.

The right and left side frame members preferably comprise tabs for use in aligning the right and left side frame members with the header frame member and the footer frame member during assembly. The presence of tabs may allow assembly by a single person, and the tabs may further allow securing of the frame components using holes outside the container envelope (thus reducing the risk of leakage inside the wall cavity). The extended profile of the tabs on the side frames allows the assembly to hold itself together when working on a flat work surface. The angular profile on the tabs allows for clearance. The two holes in the tabs align with holes in the header and footer on a plane outside of the corrugations, reducing the threat of a leak around a fastener from entering the interior envelope. The tight tolerances at the connection of the header, footer, and side frames plus the two holes in the tab locks helps prevent excess flex or movement on the X, Y, and Z planes.

In exemplary embodiments comprising the flange mounting perimeter, the window is preferably mounted to the flange mounting perimeter by holes and rivets outside of an envelope of the shipping container. Alternatively, bolts, screws, or any other suitable type of fastener could be used.

The header frame member, the footer frame member, and the right and left side frame members are preferably composed of metal. In some such embodiments, the header frame member, the footer frame member, and the right and left side frame members may be treated with a corrosion-resistant coating.

The corrugation cap is preferably of sufficient size to cover the corrugations adjacent thereto when the corrugations are warped inwardly or outwardly.

According to a second broad aspect of the present invention, there is provided a method for installing a window in a wall of a shipping container, the wall comprising corrugations, the method comprising the steps of:

a. forming an aperture in the wall sized to receive a window framing system;
b. forming the window framing system from a header frame member, a footer frame member, and right and left side frame members, securing the header frame member, the footer frame member, and the right and left side frame members together to form the window framing system;
c. positioning the window inside the window framing system;
d. securing the window within the window framing system;
e. installing a corrugation cap in the aperture to cover at least a portion of a lower edge of the aperture and the corrugations adjacent thereto;
f. inserting the window framing system with the window in the aperture on top of the corrugation cap; and
g. securing the window framing system within the aperture.

In some exemplary embodiments of the second broad aspect, the right and left side frame members comprise upper and lower tabs to allow alignment with the header frame member and the footer frame member, respectively, as part of the forming of step b.

The header frame member, the footer frame member, and the right and left side frame members may be secured together using rivets in step b. Further, the window may be riveted to the window framing system in step d. using holes outside an envelope of the shipping container.

In some exemplary embodiments the window framing system comprises inwardly-directed flanges forming a flange mounting perimeter, the method further comprising at step d. securing the window to the flange mounting perimeter.

Sealant may be used to waterproof certain components during installation. For one non-limiting example, the sealant may be applied to the window framing system before receiving the window therein at step c. In some embodiments, the window comprises a nailing fin, so the method may further comprise applying the sealant to the nailing fin, inserting the window into the window framing system, installing a window flange against the window, and riveting the flange and the nailing fin to the window framing system.

In some exemplary embodiments, a rain drip member is installed on top of the header frame member, the rain drip member configured to receive water on an upper surface thereof and direct the water outwardly away from the window framing system. The rain drip member preferably comprises a downwardly-angled portion at an outer edge thereof to allow water to drain away from the window framing system when installed in the aperture.

Exemplary embodiments of the present invention may provide a practical and efficient solution for installing windows in shipping containers, helping to ensure structural integrity, ease of installation, and effective water management.

The frames are inserted on the container walls and have a profile to secure either or both inside and outside the container. The header and footer share the same design profile, allowing for interchangeable use at the top or bottom without restriction.

The side frames feature a Z-shaped profile, with the left and right sides being mirror images and thus allowing them to be used interchangeably on either side. These side frames are attached perpendicularly to the header and footer. The preferred method of connecting the side frames to the header includes small tabs at the ends of the side frames that bend perpendicular to align with the headers and footers, simplifying assembly and reducing installation time. After alignment, the frames can be riveted together, making the process advantageous in field conditions where time and ease of installation are critical.

As noted above, all parts may be fastened together without conventional welding. The installation of the window frame may be streamlined through a series of steps that begin with assembling the frame, securing it with rivets, sealing with a sealant such as but not limited to silicone to ensure waterproofing, and culminating in the attachment of the window unit and rain drip member to optimize functionality and weather resistance.

A detailed description of exemplary embodiments of the present invention is given in the following. It is to be understood, however, that the invention is not to be construed as being limited to these embodiments. The exemplary embodiments are directed to particular applications of the present invention, while it will be clear to those skilled in the art that the present invention has applicability beyond the exemplary embodiments set forth herein.

BRIEF DESCRIPTION OF THE DRAWINGS

In the accompanying drawings, which illustrate exemplary embodiments of the present invention.

Exemplary embodiments will now be described with reference to the accompanying drawings.

DETAILED DESCRIPTION OF EXEMPLARY EMBODIMENTS

Throughout the following description, specific details are set forth in order to provide a more thorough understanding to persons skilled in the art. However, well known elements may not have been shown or described in detail to avoid unnecessarily obscuring the disclosure. The following description of examples of the invention is not intended to be exhaustive or to limit the invention to the precise form of any exemplary embodiment. Accordingly, the description and drawings are to be regarded in an illustrative, rather than a restrictive, sense. The following detailed description refers to the accompanying drawings. The same reference numbers in different drawings may identify the same or similar elements.

Figure 1:
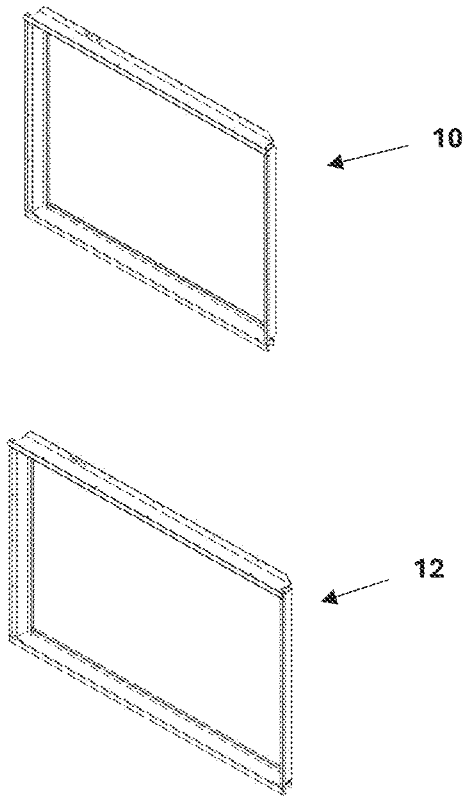
FIG. 1 shows perspective views of sidewall and endwall window framing systems according to exemplary embodiments of the present invention.
Figure 2:
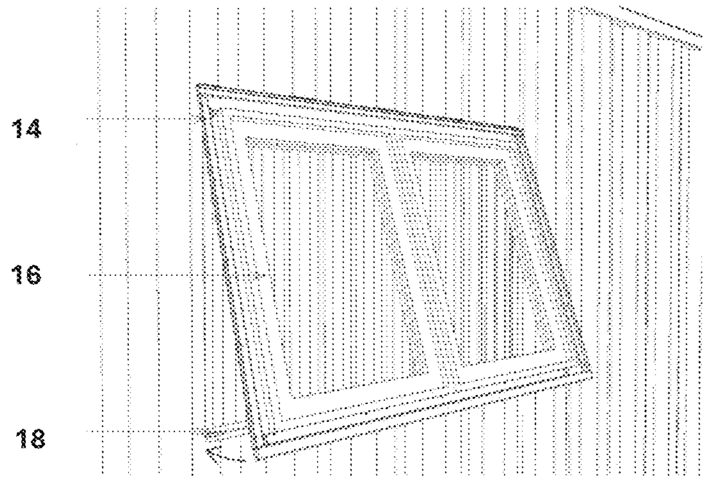
FIG. 2 is a perspective view of an exemplary sidewall window installed on a shipping container.
Figure 6:
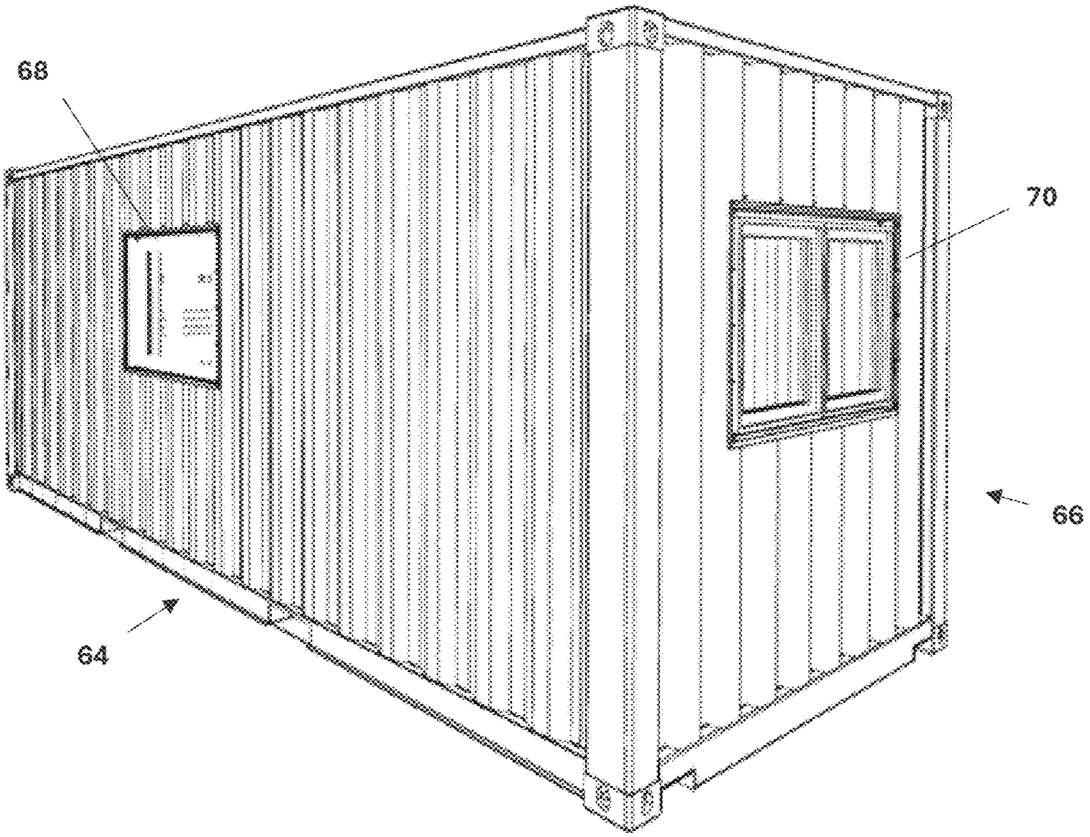
FIG. 6 is a perspective view of an exemplary sidewall and endwall window framing systems installed on a shipping container.

Turning now to the drawings, exemplary embodiments of the present invention are illustrated. FIG. 1 shows a sidewall framing system 10 and an endwall framing system 12. (FIG. 6 illustrates a shipping container, with a container sidewall 64 provided with a sidewall window frame 68, and a container endwall 66 provided with an endwall window frame 70.) FIG. 2 illustrates a window frame 14 with window unit 16 housed therein, the window frame 14 being swung into position to rest on top of the corrugation cap 18.

Figure 3:
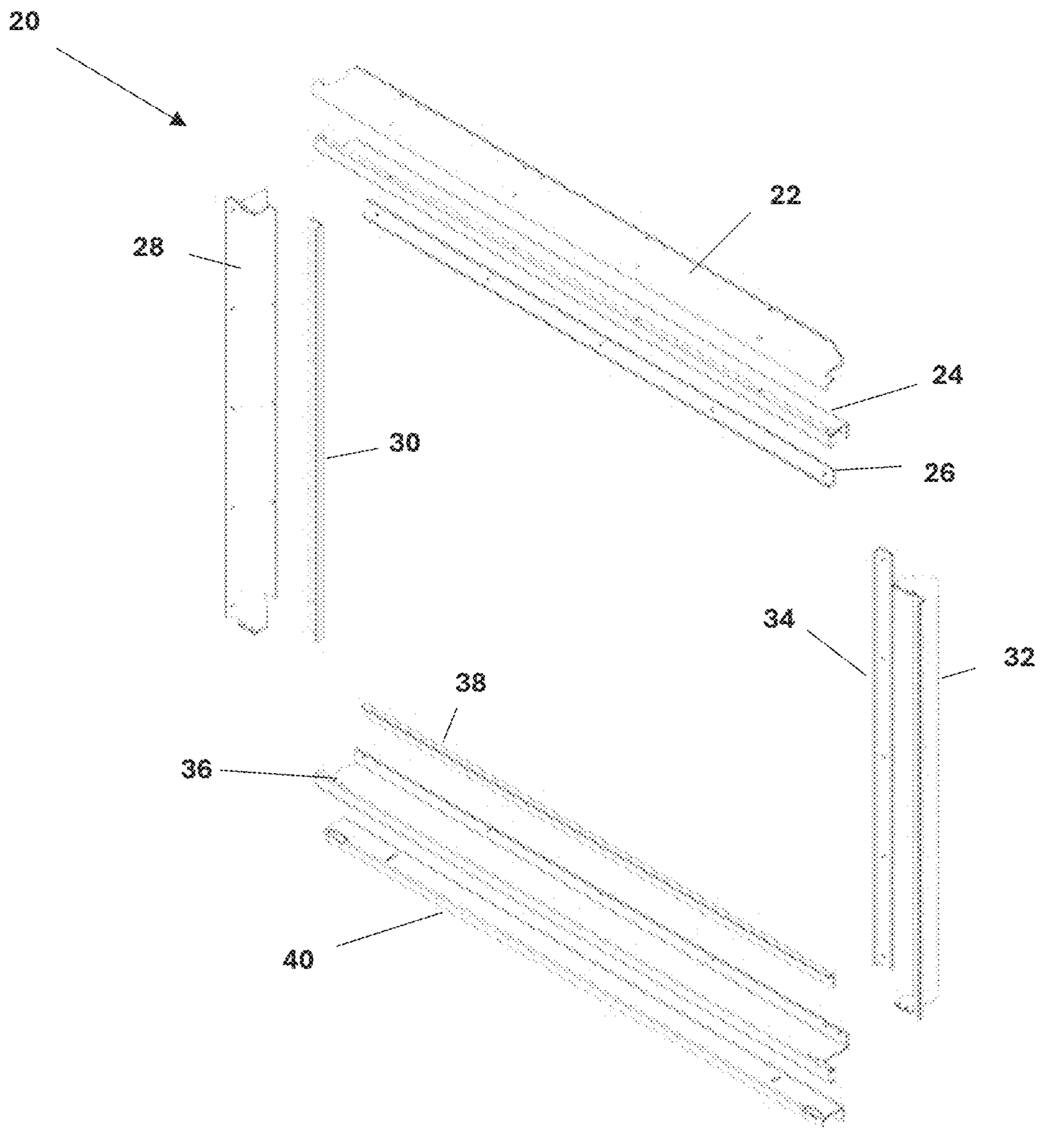
FIG. 3 is an exploded perspective view of an exemplary window framing system.

Turning to FIG. 3, an exemplary window framing system 20 is shown in exploded view. The basic frame structure comprises a header frame member 24, a footer frame member 36, and left and right side frame members 28, 32. The header 24 is provided with a header flange 26, the footer 36 is provided with a footer flange 38, the left side frame member 28 is provided with a flange 30, and the right side frame member 32 is provided with a flange 34. The frame members 24, 36, 28, 32 provide a structural support for the framing system, while the flanges 26, 38, 30, 34 provide a surface against which to retain the window when installed in the frame 20.

Also shown in FIG. 3 is an exemplary embodiment of a corrugation cap 40. As described above, the corrugation cap 40 is configured to be positioned on top of the lower edge of the wall aperture, overlying the cut-off corrugated wall and providing a structural base for the window framing system 20. The corrugation cap 40 can thus cover the corrugated wall rather than require a profile mating with a wall surface that may be uneven due to warping from the manufacturing process.

Also shown in FIG. 3 is an exemplary embodiment of a rain drip member 22. The rain drip 22 is configured for attachment to the header 24, providing a surface that receives and redirects water such as rain away from the window framing system 20, helping to prevent leakage and corrosion.

Figure 4:
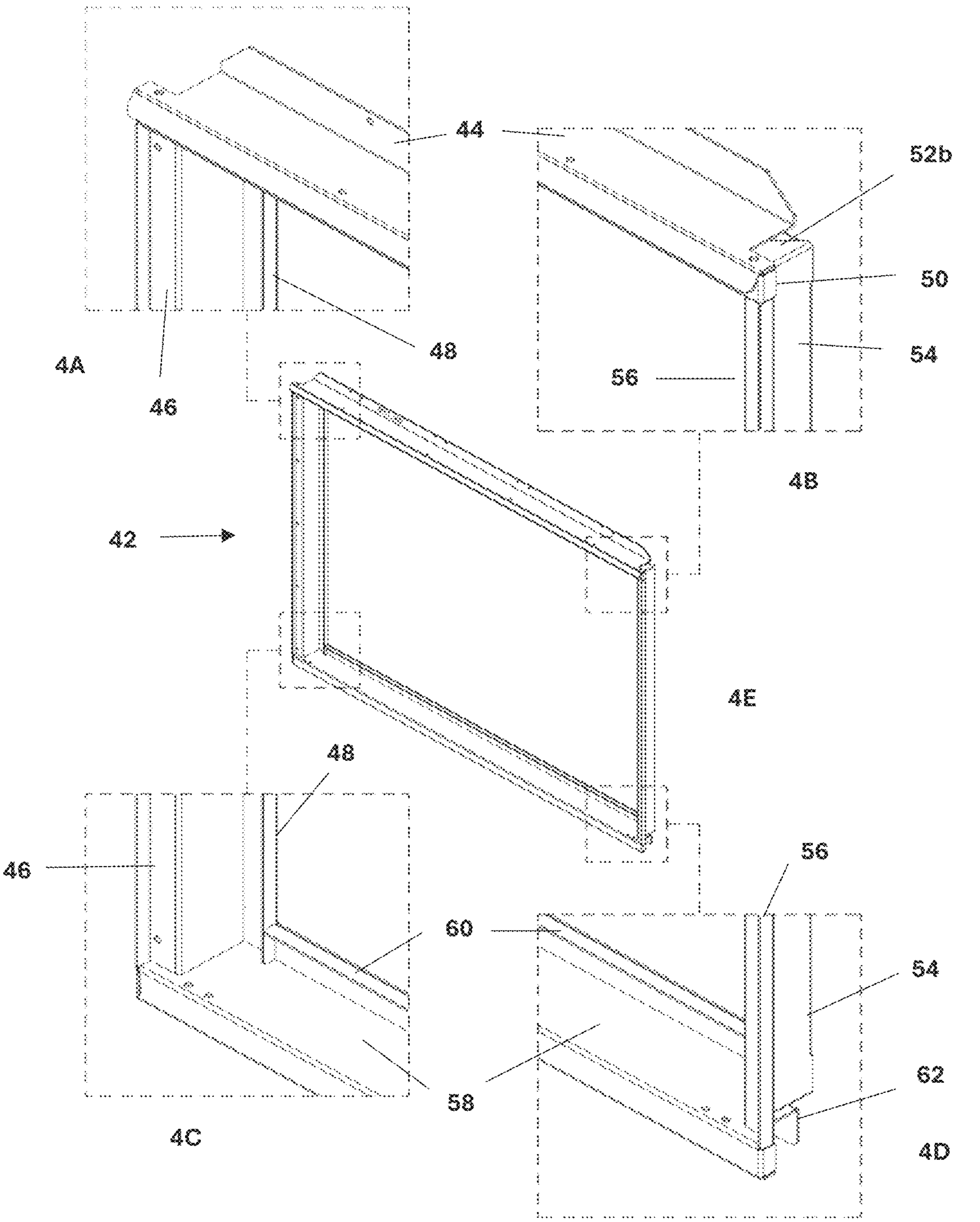
FIG. 4 illustrates front perspective views of an exemplary window frame (4E) and corner detail views (4A, 4B, 4C, and 4D).
Figure 5:
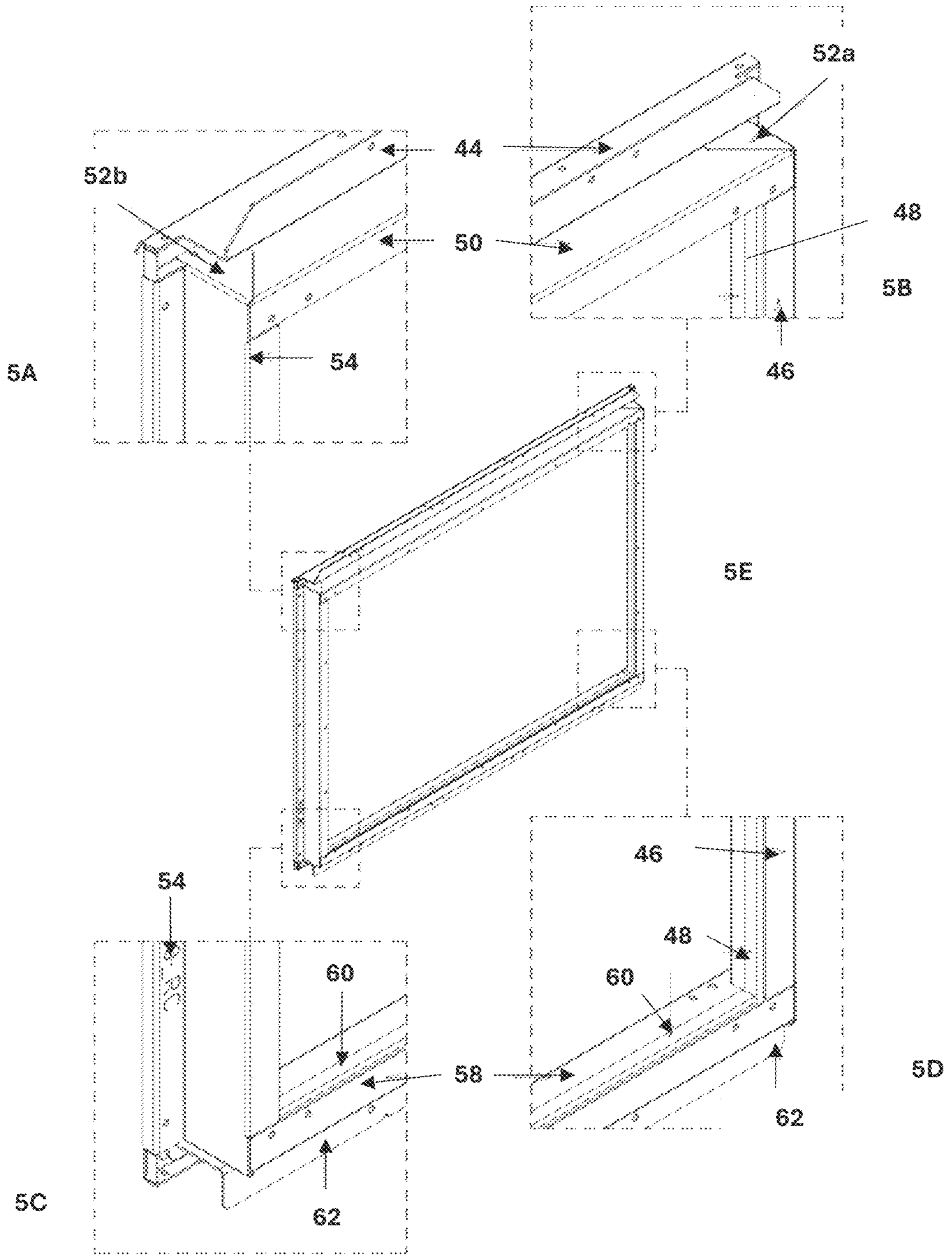
FIG. 5 illustrates rear perspective views of the exemplary window frame (5E) and corner detail view (5A, 5B, 5C, and 5D) of FIG. 4.

Turning now to FIGS. 4 and 5, which are front (exterior) and rear (interior) views respectively, an exemplary window frame 42 according to the present invention is illustrated in detail; the full window frame 42 is shown in the views labelled 4E and 5E, with the four corners shown in the detailed views labelled 4A-4D and 5A-5D. The window frame 42 comprises a quadrilateral structure of connected components—a header 50, a footer 58, a left side frame member 46, and a right side frame member 54. The header 50 has a flange mounted thereon (not shown), the footer 58 has a flange 60 mounted thereon, the left side frame member 46 has a flange 48 mounted thereon, and the right side frame member 54 has a flange 56 mounted thereon. As can be seen in views 4B and 5B, the side frame members 46, 54 comprise tabs 52*a*, 52*b*—the tabs 52*a*, 52*b* are folded over perpendicular to the long axis of the side frame members 46, 54 to align with the header 50 and footer 58, aiding in assembly of the window frame 42.

Figure 13:
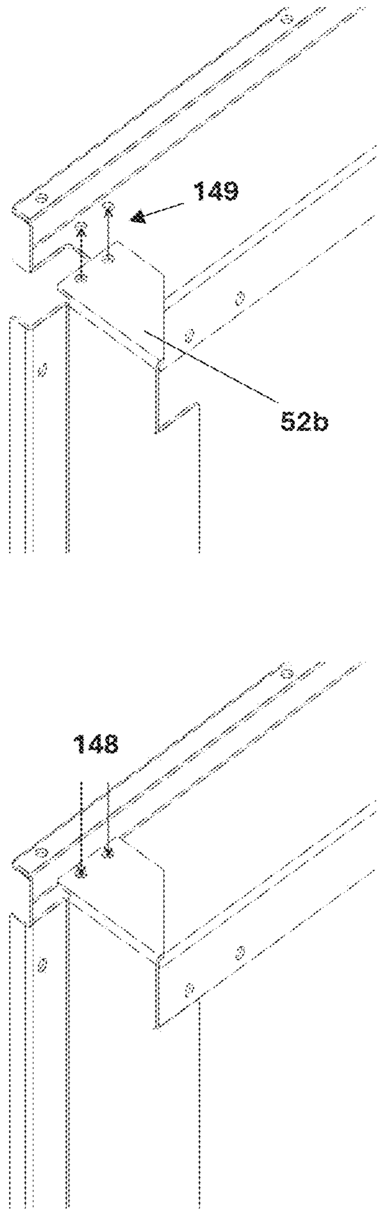
FIG. 13 illustrates means for connecting the side frame members to the header and footer frame members.

FIG. 13 illustrates in detail an exemplary embodiment in which the tabs 52*a* (not shown) and 52*b* are used to assemble the side frame members 46, 54 to the header and footer 50, 58. Corresponding holes 149 are provided in the tabs 52*a*, 52*b* and the header 50, through which rivets 148 are inserted. The holes 149 are outside the envelope of the shipping container, which therefore reduces the risk of leakage into the insulated wall cavity.

Figure 7:
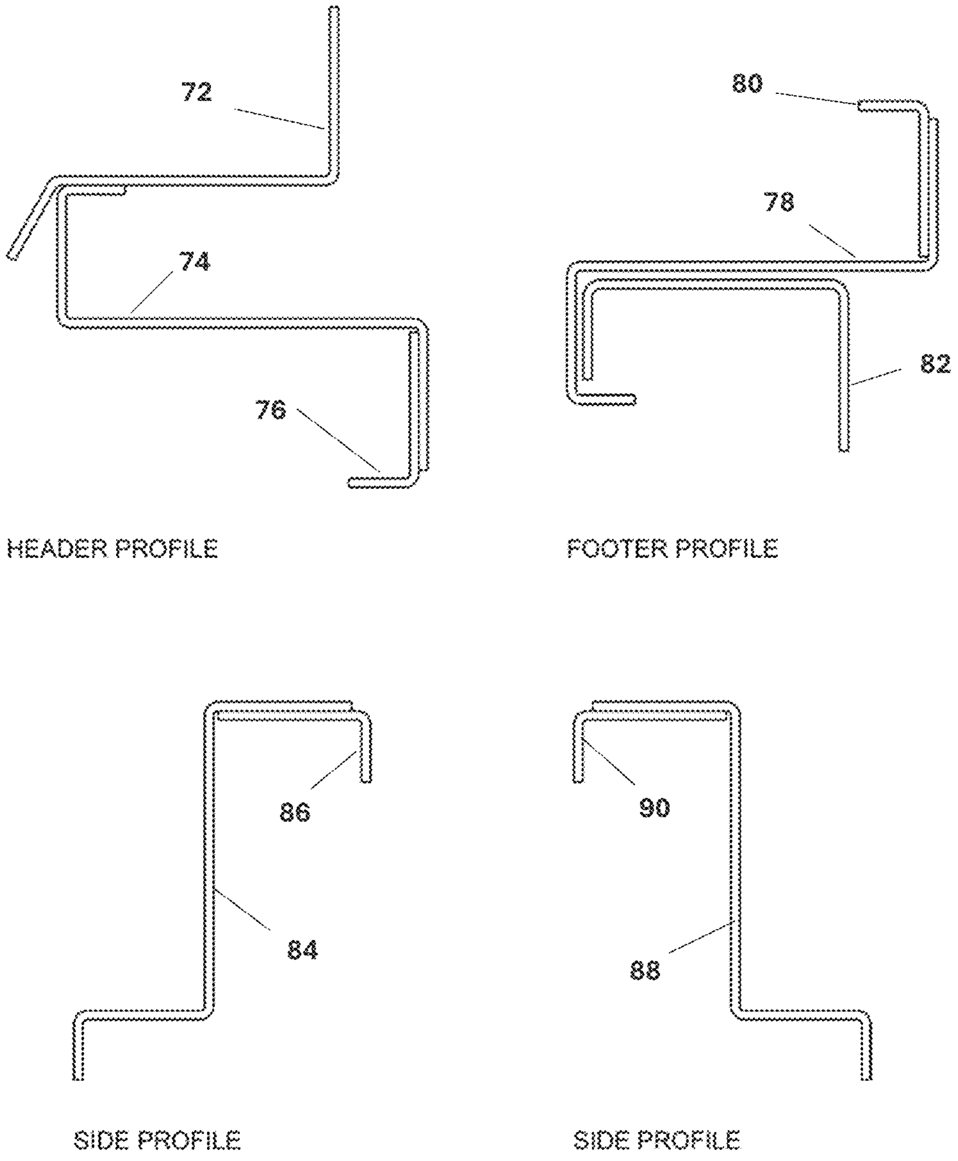
FIG. 7 illustrates sectional views of connected header, footer, and side frames for an exemplary sidewall frame.

The header 50 is also provided with a rain drip member 44, which has a rearward portion that engages an interior wall surface of the container, and a forward portion that extends outwardly and downwardly at an angle (as best shown in FIG. 7) which is designed to deflect water away from the window and prevent potential water intrusion and corrosion. The rain drip 44 has a slightly inclined surface to ensure effective water shedding.

As best shown in view 4C of FIG. 4 and view 5C of FIG. 5, the window frame 42 further comprises a corrugation cap 62. As described above, the corrugation cap 62 is designed to cover the cut-off corrugated wall and provide a structural support for the window frame 42.

Turning now to FIG. 7, detailed sectional views of the header frame member arrangement, footer frame member arrangement, and side frame member arrangements are shown for a sidewall frame system. The header arrangement comprises a header frame member 74, which serves as the base for the other arrangement components. The header 74 has a profile comprising two end segments, a lower segment to which the header flange 76 is connected, and an upper segment to which the rain drip member 72 is connected. As can be seen in FIG. 7, the footer frame member 78 has the same profile as the header 74, but inverted, with an upper segment to which the flange 80 is connected and a lower segment to which the C-shaped corrugation cap 82 is connected. As the header 74 and footer 78 profiles are identical, the parts can be used interchangeably, providing greater flexibility in assembly/installation.

The lower two views in FIG. 7 are the left side member arrangement and the right side member arrangement. The left side member arrangement comprises a left side frame member 84 to which a left side flange 86 is connected. The right side member arrangement comprises a right side frame member 88 to which a right side flange 90 is connected. As can be seen, the left side frame member 84 and the right side frame member 88 are mirror images of each other, and thus interchangeable, as are the flanges 86, 90.

Figure 9:
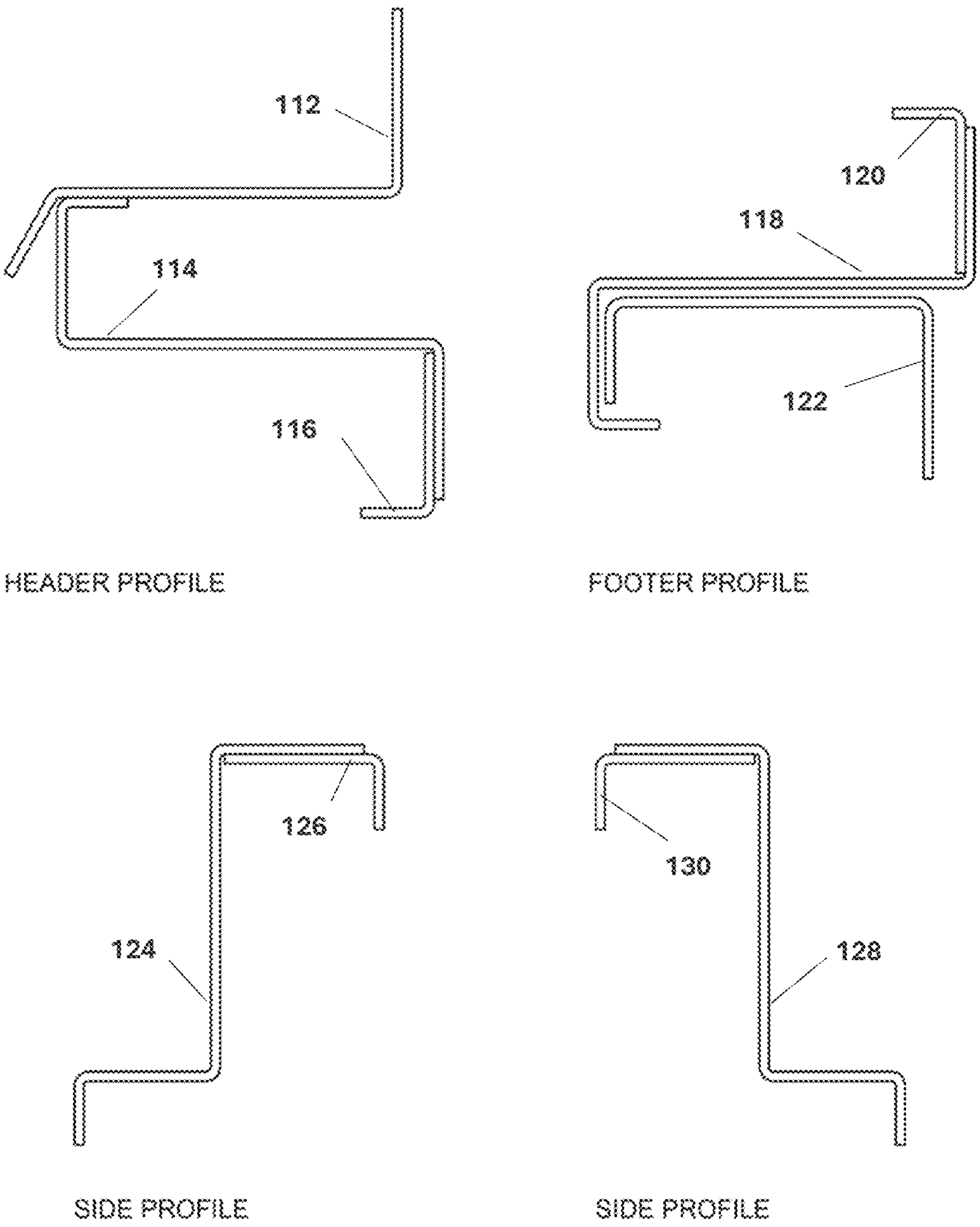
FIG. 9 illustrates sectional views of connected header, footer, and side frames for an exemplary endwall frame.

FIG. 9 illustrates comparable detailed sectional views of the header frame member arrangement, footer frame member arrangement, and side frame member arrangements but for an endwall frame system. The header arrangement comprises a header frame member 114, which serves as the base for the other arrangement components. The header 114 has a profile comprising two end segments, a lower segment to which the header flange 116 is connected, and an upper segment to which the rain drip member 112 is connected. The footer frame member 118 has the same profile as the header 114, but inverted, with an upper segment to which the flange 120 is connected and a lower segment to which the C-shaped corrugation cap 122 is connected. As the header 114 and footer 118 profiles are identical, the parts can be used interchangeably, providing greater flexibility in assembly/installation. The lower two views in FIG. 9 are the left side member arrangement and the right side member arrangement. The left side member arrangement comprises a left side frame member 124 to which a left side flange 126 is connected. The right side member arrangement comprises a right side frame member 128 to which a right side flange 130 is connected. As can be seen, the left side frame member 124 and the right side frame member 128 are mirror images of each other, and thus interchangeable, as are the flanges 126, 130.

Figure 8:
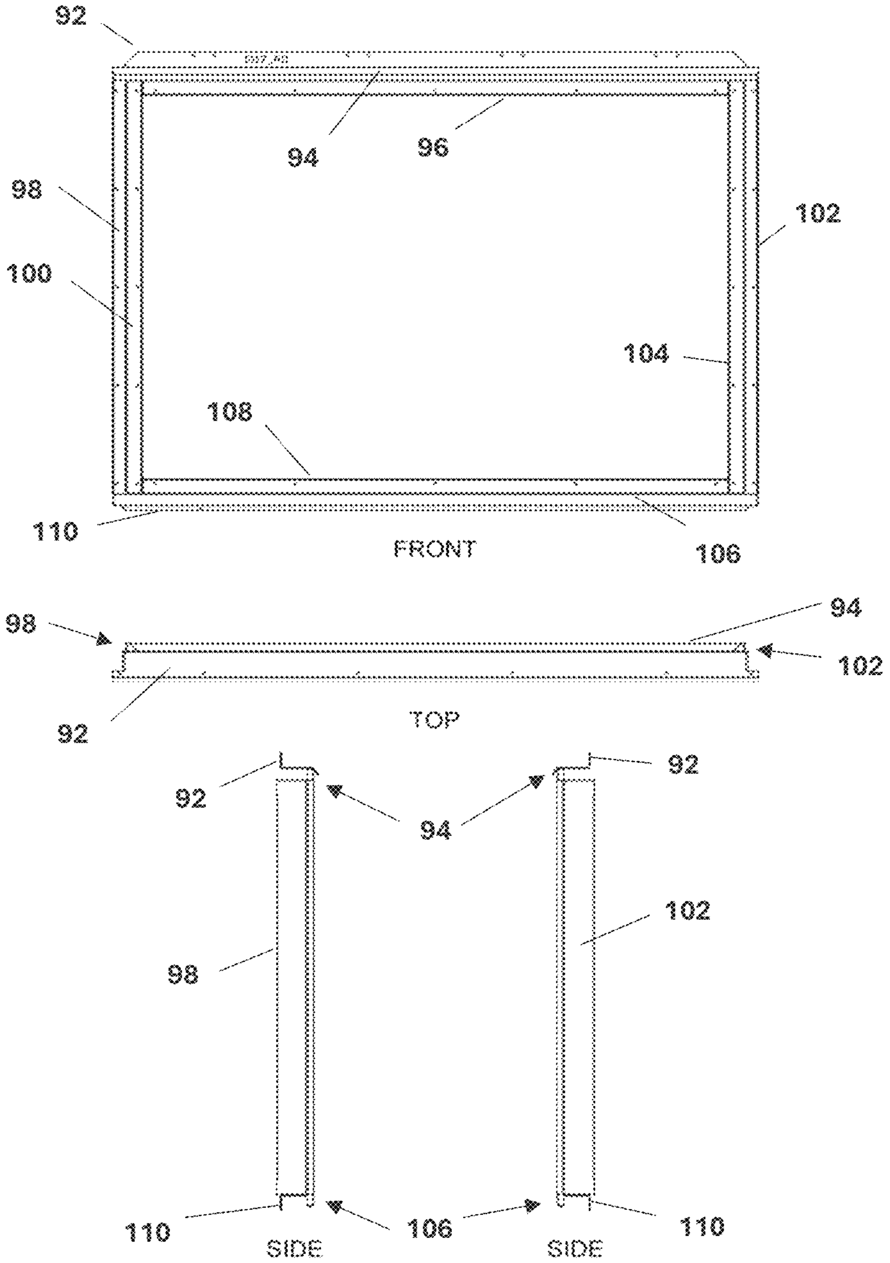
FIG. 8 illustrates front elevation, top plan, and side elevation views of an exemplary window framing system.

FIG. 8 illustrates an exemplary window framing system, again comprising four structural frame members—a header 94, a footer 106, and left and right side members 98, 102. The header 94 has a flange 96, the footer 106 has a flange 108, the left side member 98 has a flange 100, and the right side member 102 has a flange 104. The header 94 is provided with a rain drip member 92, and a corrugation cap 110 is provided for support of the window frame.

Figure 10:
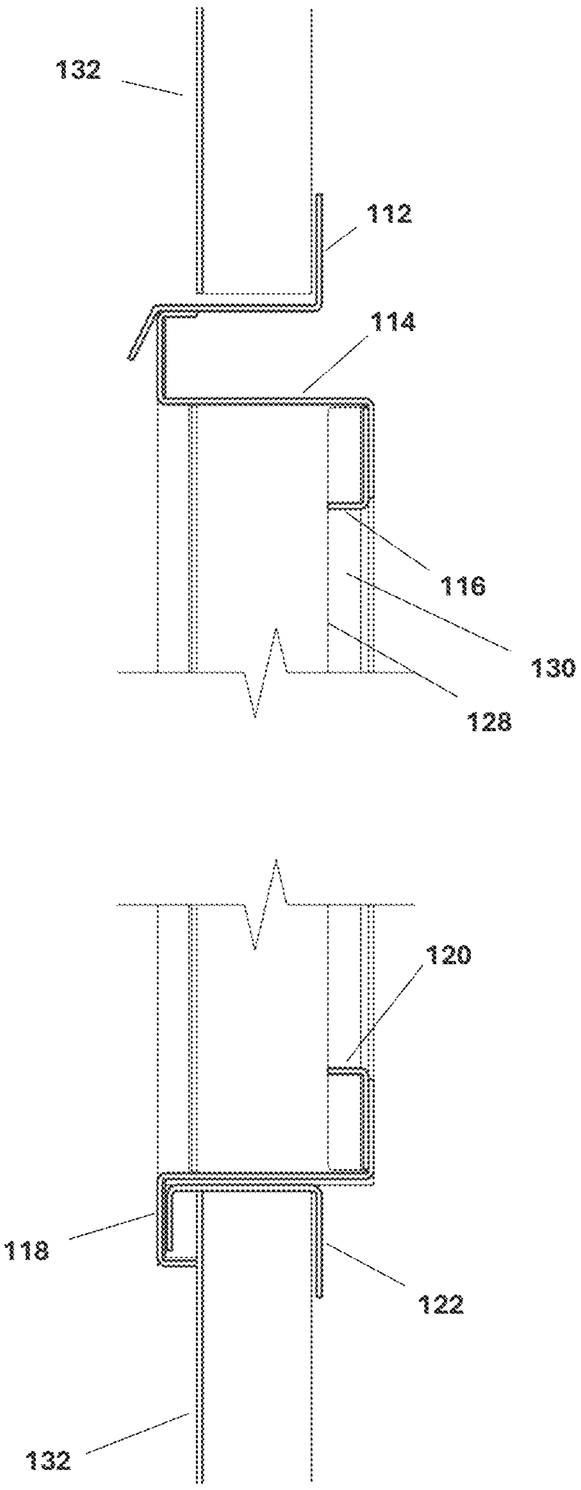
FIG. 10 is a sectional view of header and footer arrangements installed in a shipping container wall aperture.

Turning now to FIG. 10, an exemplary window framing system is shown installed on a container wall. The container exterior wall 132 has been cut open to form the aperture necessary for installation of the window framing system of FIG. 9. The header 114, footer 118, right side frame member 128, and left side frame member (not shown) form the frame basic structure. The header 114 and header flange 116 are shown, as is the rain drip member 112. The rain drip member 112 abuts the underside of the container exterior wall 132. The footer 118 and footer flange 120 are shown. The corrugation cap 122 is shown installed over the container exterior wall 132, with one downwardly-directed end segment on the outside of the wall 132 and the other downwardly-directed end segment on the inside of the wall 132.

Figure 11A:
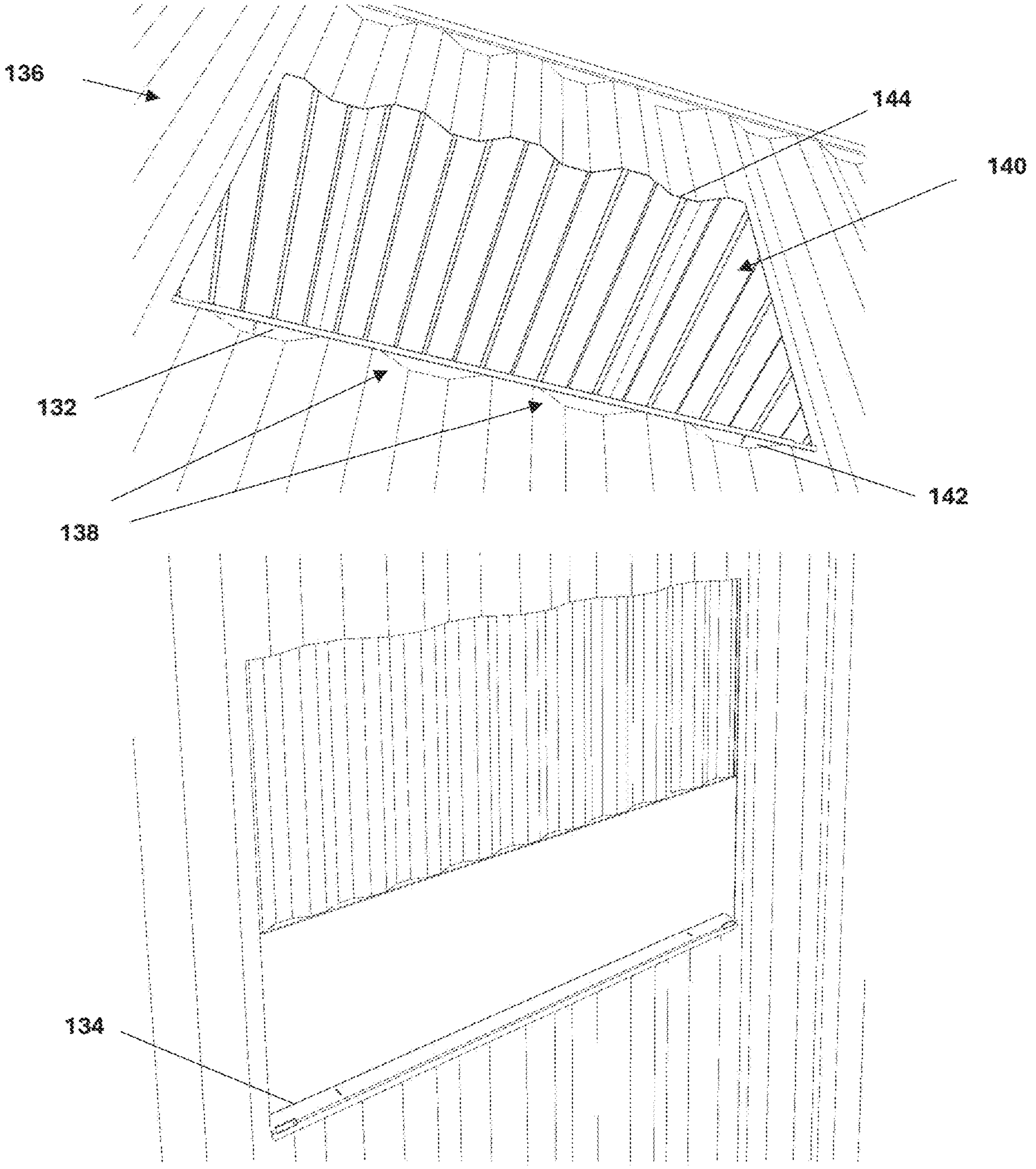
FIGS. 11*a* and 11*b* illustrate the placement and details of an exemplary corrugation cap.
Figure 11B:
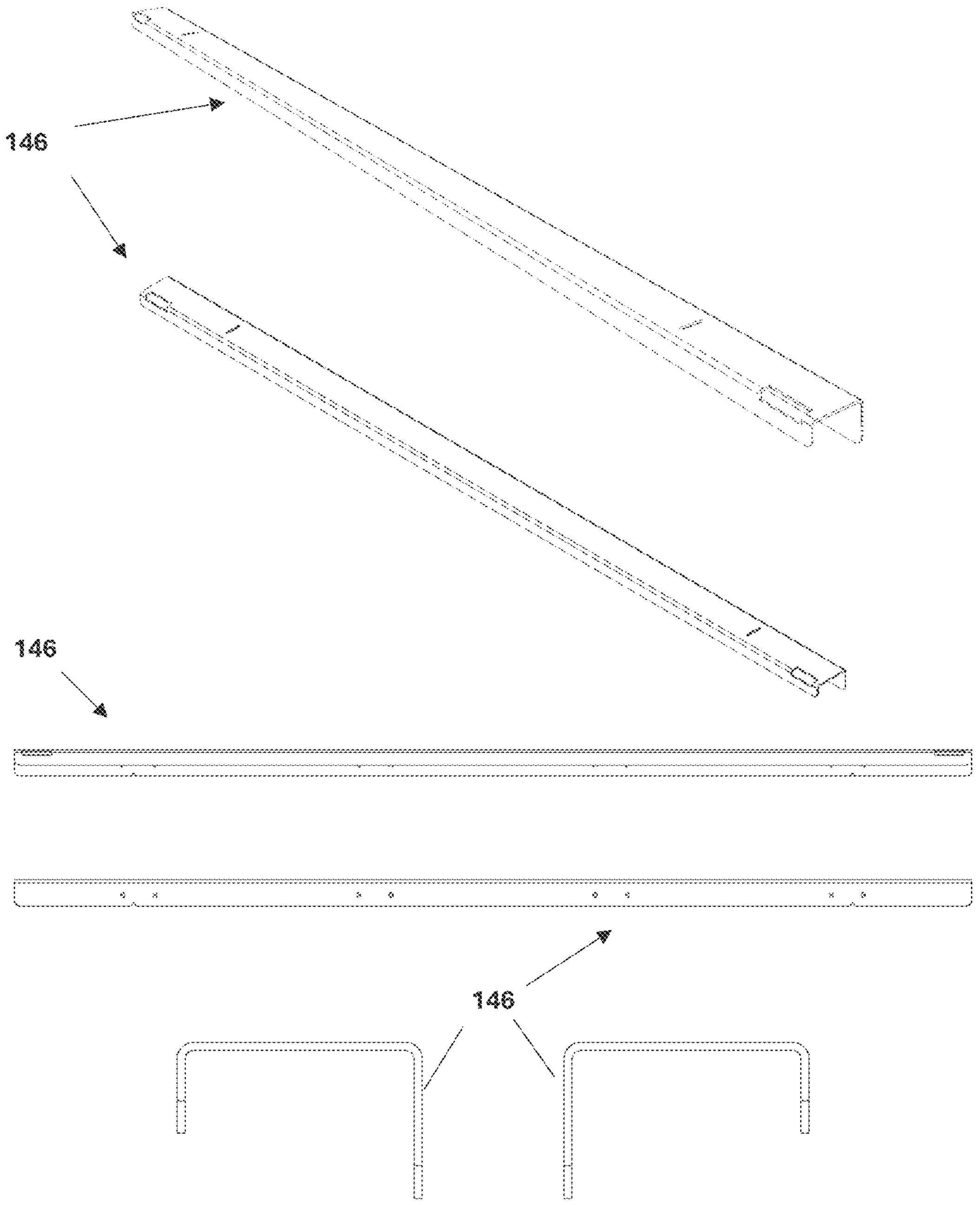

FIGS. 11*a* and 11*b* illustrate positioning and details of an exemplary corrugation cap 134. FIG. 11*a* in the upper view shows an exterior perspective view, looking upwardly at the window framing system, while the lower view looks downwardly toward the corrugation cap 134. As can be seen in the upper view of FIG. 11*a*, the corrugations 138 in the container wall 136 present an uneven surface. The aperture 140 is formed in the container wall 136, having an upper edge 144 and a lower edge 142. The corrugation cap 134 covers the corrugations 138 at the lower edge 142 fully, providing a straight and even support surface for the window framing system. FIG. 11*b* illustrates an exemplary corrugation cap 146 from perspective, front elevation, rear elevation, and side elevation views.

Figure 12A:
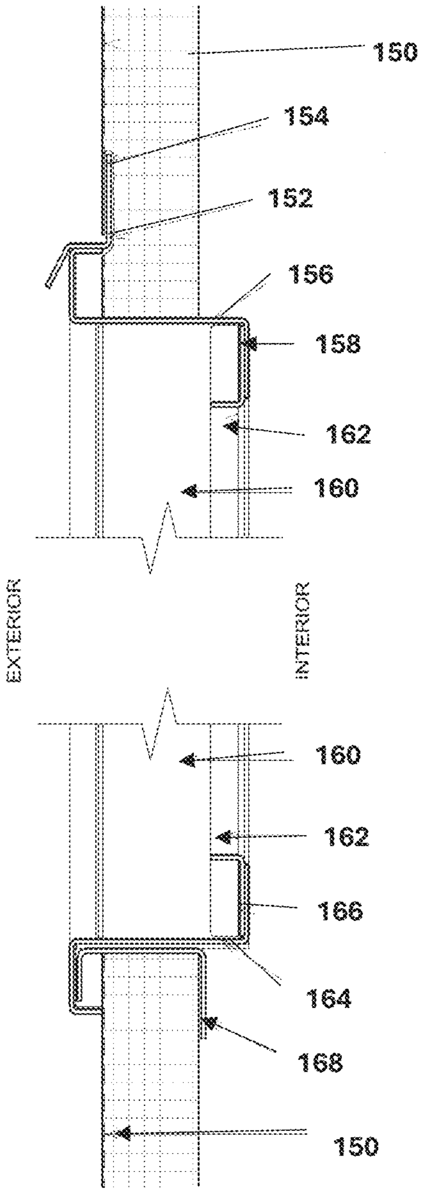
FIGS. 12*a* and 12*b* illustrate a window framing system for use with non-corrugated, insulated shipping container walls.
Figure 12B:
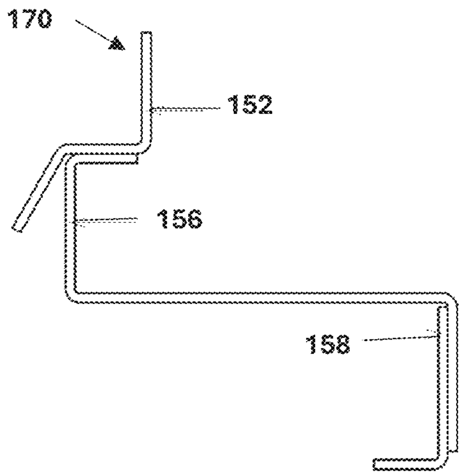
Figure 12B:
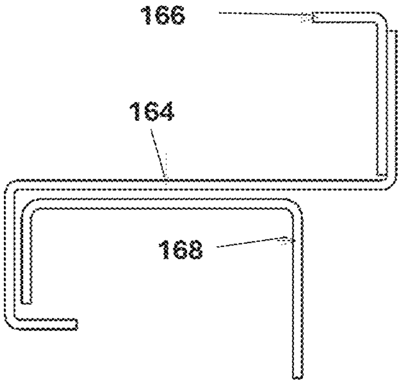
Figure 12B:
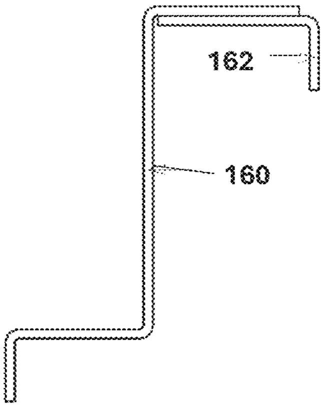
Figure 12B:
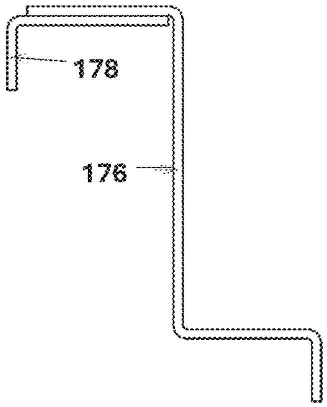

Exemplary embodiments of aspects of the present invention may also be used with shipping containers having smooth (non-corrugated) sides (or even buildings having smooth walls). For example, FIGS. 12*a* and 12*b* illustrate a window framing system for use with non-corrugated, insulated shipping container walls. The wall is insulated with a foil-wrapped rigid insulation 150. FIG. 12*a* illustrates how the wall surface is cut away higher than the insulation 150, allowing the rain drip member 154 to be inserted. As can be seen in FIG. 12*a*, the rain drip member 152 (which is connected to an upper surface of the header frame member 156) has an upper flange that is inserted into the insulation 150, with foil 154 overlapping the rain drip 152, and the rain drip 152 could be fastened by a fastener through the outer wall. FIG. 12*b* illustrates a slight modification with the upper flange 170 of the rain drip 152 being shorter than that in FIG. 12*a*. The other illustrated features are generally as described above, namely the header flange 158, the left side frame member 160, the left side flange 162, the footer frame member 164, the footer flange 166, the right side frame member 176, and the right side flange 178. As this embodiment is directed to a non-corrugated wall installation, the cut-out cap 168 is configured to cover a section of the straight wall rather than an undulating corrugation profile.

An exemplary installation process for window framing systems involves the following steps:

1. Frame Assembly: The side frames are attached perpendicularly to the header and footer, with the tabs on the side frames bending to align with the header and footer. The frames are then riveted together at the corners, creating a robust and stable frame structure.
2. Sealing: Sealant is applied to the inside flange of the assembled frame to help ensure a waterproof seal. The window unit is then laid into the frame and centered.
3. Window Attachment: Sealant is applied to the nailing fin of the window unit. The window flanges are then laid into position within the frame. The flange, nailing fin, and window frame are riveted together, securing the window unit in place.
4. Rain Drip Installation: The rain drip is attached to the top portion of the window frame, directly opposite the drain holes in the window unit. This helps ensure that any water running down the window frame is effectively deflected away from the structure, enhancing water management and helping prevent potential damage.
5. Further Sealing: Sealant is then applied at the seam of the cut-off corrugations and the rain drip.

The components of exemplary window framing systems may be made from lightweight materials, which can then simplify shipping and handling. The exemplary embodiments may be executed without the need for welding, thus supporting insulation use and reducing the risk of warping. The corrugation cap at the bottom of the frame may align with the ISO shipping container corrugations, addressing issues related to twisted or uneven walls and helping ensure the structural integrity of the installed window.

The foregoing is considered as illustrative only of the principles of the present invention. The scope of the claims should not be limited by the exemplary embodiments set forth in the foregoing, but should be given the broadest interpretation consistent with the specification as a whole.

What is claimed is:

1. A window framing system for installation in an aperture in a shipping container wall, the shipping container wall comprising corrugations, the system comprising:
- a corrugation cap sized and configured to cover at least a portion of a lower edge of the aperture and the corrugations adjacent thereto; and
- the corrugation cap configured for positioning thereon of a lower portion of a window within the window framing system;
- a header frame member;
- a footer frame member; and
- right and left side frame members;
- wherein the header frame member, the footer frame member, and the right and left side frame members configured for connection to form a quadrilateral frame for receipt of the window therein;
- wherein each of the header frame member, the footer frame member, and the right and left side frame members comprises an inwardly-directed flange to form a flange mounting perimeter, to which flange mounting perimeter the window is configured for mounting; and
- wherein the window is mounted to the flange mounting perimeter by holes and rivets outside of an interior envelope of the shipping container.

2. The window framing system of claim 1 wherein the corrugation cap is a C-shaped channel comprising inner and outer downwardly-directed portions configured for positioning adjacent inner and outer surfaces of the wall, respectively.

3. The window framing system of claim 1 wherein the footer frame member is disposed between the corrugation cap and the lower portion of the window.

4. The window framing system of claim 1 further comprising a rain drip member mounted on an upper surface of the header frame member, the rain drip member configured to receive water on an upper surface thereof and direct the water outwardly away from the wall.

5. The window framing system of claim 1 wherein the right and left side frame members comprise tabs for use in aligning the right and left side frame members with the header frame member and the footer frame member.

6. The window framing system of claim 1 wherein the header frame member, the footer frame member, and the right and left side frame members are composed of metal.

7. The window framing system of claim 6 wherein the header frame member, the footer frame member, and the right and left side frame members are treated with a corrosion-resistant coating.

8. The window framing system of claim 1 wherein the corrugation cap is of sufficient size to cover the corrugations adjacent thereto when the corrugations are buckled inwardly or outwardly.

9. A method for installing a window in a wall of a shipping container, the wall comprising corrugations, the method comprising the steps of:
- a. forming an aperture in the wall sized to receive a window framing system;
- b. forming the window framing system from a header frame member, a footer frame member, and right and left side frame members, securing the header frame member, the footer frame member, and the right and left side frame members together to form the window framing system;

c. positioning the window inside the window framing system;

d. securing the window within the window framing system wherein the window is riveted to the window framing system using holes outside an interior envelope of the shipping container;

e. installing a corrugation cap in the aperture to cover at least a portion of a lower edge of the aperture and the corrugations adjacent thereto;

f. inserting the window framing system with the window in the aperture on top of the corrugation cap; and g. securing the window framing system within the aperture.

10. The method of claim 9 wherein the right and left side frame members comprise upper and lower tabs to allow alignment with the header frame member and the footer frame member, respectively, as part of the forming of step b.

11. The method of claim 9 wherein the header frame member, the footer frame member, and the right and left side frame members are secured together using rivets in step b.

12. The method of claim 9 wherein the window framing system comprises inwardly-directed flanges forming a flange mounting perimeter, the method further comprising at step d. securing the window to the flange mounting perimeter.

13. The method of claim 9 further comprising applying a sealant to the window framing system before receiving the window therein at step c.

14. The method of claim 9 wherein the window comprises a nailing fin, the method further comprising applying a sealant to the nailing fin, inserting the window into the window framing system, installing a window flange against the window, and riveting the flange and the nailing fin to the window framing system.

15. The method of claim 9 further comprising before step f., installing a rain drip member on top of the header frame member, the rain drip member configured to receive water on an upper surface thereof and direct the water outwardly away from the window framing system.

16. The method of claim 15 wherein the rain drip member comprises a downwardly-angled portion at an outer edge thereof to allow water to drain away from the window framing system when installed in the aperture.

* * * * *